(12) United States Patent
Castell

(10) Patent No.: US 11,041,553 B2
(45) Date of Patent: Jun. 22, 2021

(54) EVERTED BALL SCREW DRIVE

(71) Applicant: AMETEK, INC., Berwyn, PA (US)

(72) Inventor: Daniel William Castell, Broken Arrow, OK (US)

(73) Assignee: AMETEK, INC., Berwyn, PA (US)

( * ) Notice: Subject to any disclaimer, the term of this patent is extended or adjusted under 35 U.S.C. 154(b) by 0 days.

(21) Appl. No.: 16/411,322

(22) Filed: May 14, 2019

(65) Prior Publication Data

US 2020/0362946 A1 Nov. 19, 2020

(51) Int. Cl.
*F16H 25/22* (2006.01)
*F16H 25/20* (2006.01)

(52) U.S. Cl.
CPC ..... *F16H 25/2228* (2013.01); *F16H 25/2209* (2013.01); *F16H 2025/204* (2013.01)

(58) Field of Classification Search
CPC .......................... F16H 25/2228; F16H 25/2209
See application file for complete search history.

(56) References Cited

U.S. PATENT DOCUMENTS

| | | | |
|---|---|---|---|
| 2,398,789 A * | 4/1946 | Hoffar ................. | F16H 25/2228 74/424.85 |
| 2,590,745 A * | 3/1952 | Guido Wuensch ......................... | F16H 25/2228 74/625 |
| 2,975,649 A * | 3/1961 | Propst ................. | F16H 25/2228 74/424.87 |
| 3,580,098 A | 5/1971 | Goad | |
| 4,258,584 A * | 3/1981 | Haegele ............... | F16H 25/2228 74/424.85 |
| 4,366,723 A * | 1/1983 | Wilke ................. | F16H 25/2228 74/216.3 |
| 5,092,539 A | 3/1992 | Caero | |

(Continued)

FOREIGN PATENT DOCUMENTS

DE 102015109159 A1 12/2015
EP 3348452 A1 7/2018
(Continued)

OTHER PUBLICATIONS

Jonathan Kasberg, The Fundamentals of Ball Screws, Machine Design, Aug. 2015, pp. 24-27.
(Continued)

*Primary Examiner* — Randell J Krug
(74) *Attorney, Agent, or Firm* — Culhane Meadows PLLC; Stephen J. Weed

(57) ABSTRACT

Linear actuators are described herein. In particular embodiments, a linear actuator includes an everted ball screw assembly comprising a hollow screw shaft with internal threads, a ball cylinder concentrically positioned therein and having external threads, and a plurality of bearing balls sized to fit in a substantially contiguous series along a working pathway defined by the space between the internal and external threads. The linear actuator may include a support bearing for rotatably supporting the screw shaft in a housing. The ball cylinder in particular embodiments includes an internal return path along which the balls return to the working pathway. The everted ball screw assembly may include a lash reduction assembly and one or more scoop inserts that are sized and shaped to guide the balls into the internal return path and back onto the working pathway.

15 Claims, 11 Drawing Sheets

(56) References Cited

U.S. PATENT DOCUMENTS

| | | | |
|---|---|---|---|
| 5,809,838 | A | 9/1998 | Miyaguchi et al. |
| 6,176,149 | B1 | 1/2001 | Misu |
| 6,202,498 | B1* | 3/2001 | Schlenker ............ F16H 25/2228 74/424.85 |
| 8,109,169 | B2 | 2/2012 | Kato et al. |
| 9,027,424 | B2 | 5/2015 | Flamme |
| 2001/0020400 | A1* | 9/2001 | Walton ................ F16H 25/2214 74/424.87 |
| 2004/0093973 | A1* | 5/2004 | Halasy-Wimmer ....... B21F 3/02 74/424.85 |
| 2012/0240706 | A1 | 9/2012 | Ohkubo et al. |
| 2015/0053036 | A1* | 2/2015 | Chen ...................... B66B 9/025 74/424.82 |
| 2015/0362050 | A1* | 12/2015 | Kuo .................... F16H 25/2214 74/424.85 |
| 2015/0369349 | A1 | 12/2015 | Kuo et al. |
| 2016/0186887 | A1 | 6/2016 | Dubus et al. |
| 2017/0023080 | A1* | 1/2017 | Gerber ................... B60T 7/107 |

FOREIGN PATENT DOCUMENTS

| | | |
|---|---|---|
| EP | 3348865 A1 | 7/2018 |
| JP | 2006234151 A | 9/2006 |
| WO | 2015081191 A1 | 6/2015 |

OTHER PUBLICATIONS

International Search Report and Written Opinion for International Application No. PCT/US2020/032955, dated Jul. 17, 2020 (Jul. 17, 2020)—12 pages.

* cited by examiner

EVERTED BALL SCREW DRIVE

TECHNICAL FIELD

The disclosed subject matter includes examples of everted ball screw drives and, in particular, everted ball screw assemblies for driving linear actuators.

BACKGROUND

A conventional ball screw assembly includes an elongate threaded shaft, a ball nut with matching threads, and a plurality of load-bearing balls that travel along the helical pathway created between the shaft threads and the nut threads. After moving along the helical pathway, the balls travel along a return pathway, in a generally continuous loop. If the shaft is fixed axially, then rotation of the shaft will impart linear motion to the ball nut. If the ball nut is fixed axially, then rotation of the ball nut will impart linear motion to the shaft. In this way, a ball screw converts rotational motion to linear motion with high mechanical efficiency and accuracy. Ball screws are used, for example, to drive linear actuators that are used in applications that require precise movement, high efficiency, and durability.

A conventional ball screw assembly typically requires a significant amount of space because the assembly is rather large in both diameter and total length. The ball nut is large in diameter because of the space occupied by the return pathway, which can be located inside the nut or externally. The housing is long because space is needed to accommodate the motion of the ball nut through the entire stroke length. A conventional ball screw assembly, for example, may have a total length that is equal to three times the stroke length, plus the ball nut length, plus the thickness of the end plates.

A conventional ball screw assembly has a generally small effective radius because the balls inside the nut travel around and close to the central axis of the threaded shaft. For such a device with a small radius, an eccentric load can generate high forces that can cause buckling, especially for a relatively long shaft such as those needed for a conventional ball screw. Shafts that are bent or warped due to repeated actuation under an eccentric load will also degrade the accuracy of the linear motion. To prevent bending and preserve accuracy, a conventional ball screw under eccentric loading may require additional support structures inside and/or outside the housing.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to-scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 8A is a perspective view of the scoop insert, showing the contoured surfaces of the scoop portion and the ledges on one side of the body portion.

FIG. 8B is a top view of the scoop insert.

FIG. 8C is a perspective view of the scoop insert, showing the contoured surfaces of the scoop portion and the passage through the body portion.

FIG. 8D is a side view of the scoop insert, showing the ledges on one side of the body portion.

FIG. 8E is a side view of the scoop insert, showing the shoulder surfaces around the scoop portion.

FIG. 8F is a sectional view of the scoop insert taken along line 8F-8F of FIG. 8E, showing the ball guide surfaces and the passage through the body portion.

DETAILED DESCRIPTION

Figure 1:
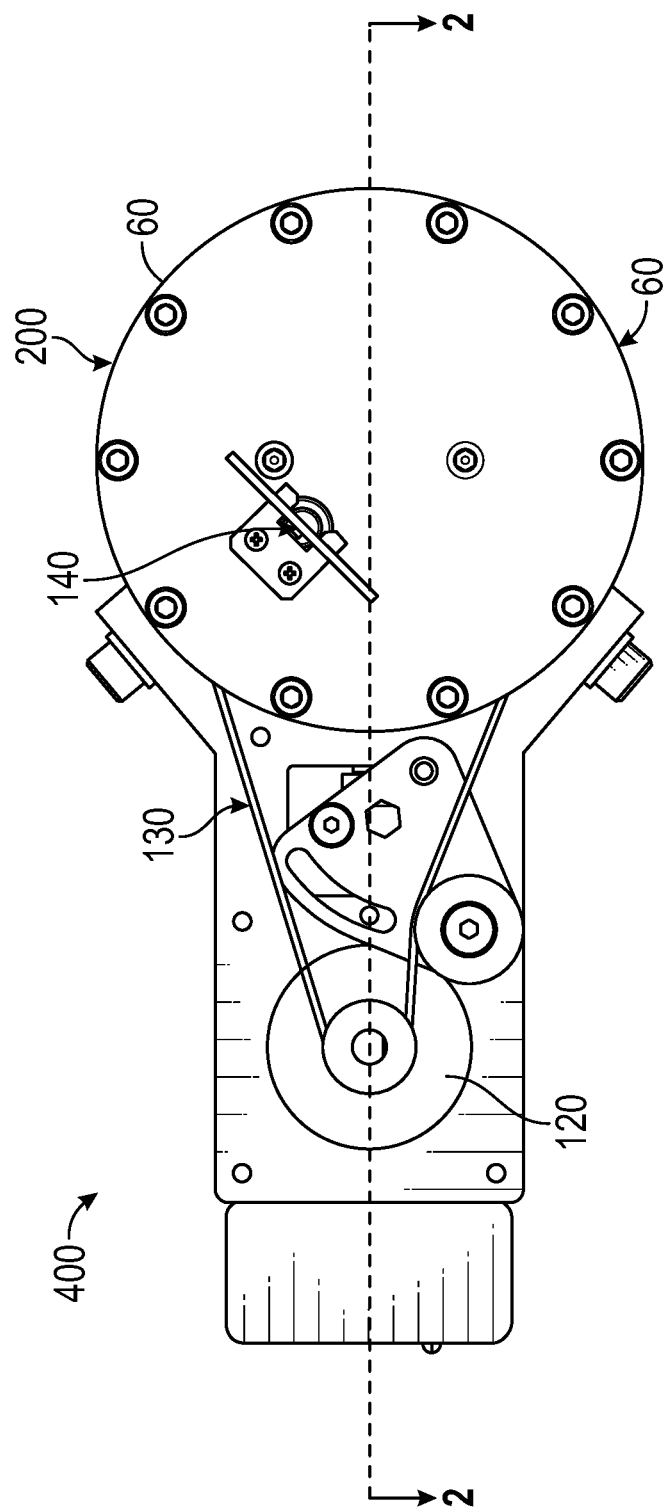
FIG. 1 is a bottom view of a linear actuator assembly, in accordance with some implementations.

The following detailed description includes numerous details and examples that are intended to provide a thorough understanding of the subject matter and its relevant teachings. Those skilled in the relevant art may understand how to apply the relevant teachings without such details. This disclosure is not limited to the specific devices, systems, and methods described because the relevant teachings can be applied or practiced in a variety of ways. The terminology and nomenclature used herein is for the purpose of describing particular aspects only and is not intended to be limiting.

Those skilled in the relevant art will recognize and appreciate that many changes can be made to the various aspects of the implementations described herein, while still obtaining the beneficial results. It will also be apparent that some of the desired benefits can be obtained by selecting some of the features, but not others. Accordingly, those who work in the art will recognize that many modifications and adaptations are possible and may even be desirable in certain applications, and that these are part of the disclosure.

The terms "comprising" and "including," and any forms thereof, are intended to indicate a non-exclusive inclusion;

that is, to encompass a list that includes the items listed and may include others not expressly listed. As used herein, the singular forms "a," "an" and "the" include plural referents unless the context clearly dictates otherwise. Thus, for example, reference to a component can include two or more such components unless the context indicates otherwise. Relational terms such as "first" and "second" and the like may be used solely to distinguish one element or action from another, without implying any particular order between such elements or actions.

The terms "optional" or "optionally" mean that the subsequently described element or action may or may not occur. In other words, such a description includes instances where the element or action occurs and instances where it does not.

Then term "facilitate" means to aid, assist, enable, improve, or make easier. The term "inhibit" means to hinder, restrain, impede, restrain, thwart, oppose, or obstruct.

The words "proximal" and "distal" are used to describe items or portions of items that are situated closer to and away from, respectively, a user or a viewer. Thus, for example, the near end or other portion of an item may be referred to as the proximal end, whereas the generally opposing portion or far end may be referred to as the distal end.

Then term "continuous" means consecutive, uninterrupted, ongoing, circulating, or forming a series without exceptions or reversals. The term "contiguous" means touching, abutting, meeting, or sharing a common border.

Then term "inverted" means to arrange one or more elements in a reversed or opposite position. The term "everted" means to arrange elements in an inside-out orientation.

A screw is one of the six classical simple machines. Geometrically, a screw can be thought of as an inclined plane wrapped around a cylinder. A common screw includes a cylindrical shaft with helical ridges and grooves called threads around the exterior surface. Thread depth is the distance between the peak or crest of a thread to the valley or root. The major diameter of an external screw thread is measured from the crest of each thread. The minor diameter is measured from the root of each thread. The pitch of a thread is the distance from one crest to the next. The sides of the valley formed by the threads are called flanks. The pitch diameter refers to the diameter of a cylindrical surface that intersects the thread flanks at equidistant points when viewed in cross section; the distance between these points is exactly half the pitch.

A cylindrical coordinate system is based on a longitudinal axis extending through and lengthwise along the center of the cylinder. Linear motion refers to movement along or parallel to the longitudinal axis. Rotation refers to circular motion of an object around the longitudinal axis. Radial motion refers to movement of an object in a radial direction, either toward or away from the longitudinal axis.

A conventional ball screw actuator typically requires a significant amount of space because the assembly is large in both diameter and total length. For example, the ball screw assembly may have a total length that is equal to three times the stroke length, plus the ball nut length, plus the thickness of the end plates. There is a need in the art for linear actuators that are capable of operating in a small space.

There is also a need for linear actuators that are capable of withstanding a significant eccentric load. Most conventional ball screws have a small effective radius, which means that eccentric loads will generate high forces that can cause buckling of the screw shaft. Thus, there exists a need in the art for linear actuators having a larger effective radius, capable of withstanding eccentric loads without buckling.

Although the various embodiments and implementations are described with reference to a linear actuator driven by an everted ball screw assembly, the systems and methods described herein may be applied to and used with any of a variety of systems, especially those in which high mechanical efficiency, precision, and durability are desired.

A conventional ball screw includes a solid screw shaft (with an external thread) and a ball nut (with an internal thread). The ball screw assemblies, as described herein, are referred to as everted because they include a hollow screw shaft (with an internal thread) and a ball cylinder (instead of a ball nut; with an external thread).

An everted ball screw assembly, according to some example implementations described herein, includes a hollow screw shaft having an internal thread on its interior surface. The assembly may include a support bearing for supporting the hollow screw shaft in a housing. The support bearing may be configured to inhibit linear motion and facilitate rotation of the hollow screw shaft. A ball cylinder with external threads is concentrically disposed inside the hollow screw shaft. The ball cylinder has an external thread that is sized and shaped to oppose the internal thread on the interior surface of the hollow screw shaft. The external thread and internal thread are similar in size and pitch, but they are not in direct contact like a typical nut and bolt. Instead, there is a space between the threads; this space forms a substantially continuous working pathway for a plurality of balls of uniform size. The balls may rest on the sides or flanks of the threads, with sufficient clearance to allow the balls to roll along the working pathway. With the balls positioned between the threads, the hollow screw shaft and the ball cylinder are moveable relative to one another.

The ball cylinder includes an internal return path extending through the body of the ball cylinder, allowing the balls to return to the start of the working pathway. The internal return path and the working pathway, together, define a substantially continuous ball circulation pathway. The diameter of the balls is selected so the balls will fit in a substantially contiguous series when positioned along the ball circulation pathway. The assembly may also include one or more limiters positioned to inhibit rotation and facilitate linear motion of the ball cylinder. With the ball cylinder free in rotation only, any rotation of the hollow screw shaft (by a motor, for example) will drive the balls along the continuous ball circulation pathway, thereby causing the ball cylinder to move in a linear direction inside the hollow screw shaft. In this manner, the rotational motion of the shaft is converted to the linear motion of the ball cylinder.

FIG. 1 is a bottom view of a linear actuator assembly 400 according to some implementations. The linear actuator assembly 400 may include a motor 120 and an everted ball screw assembly 200. The motor 120 drives a belt 130 which is engaged with the everted ball screw assembly 200. Other types of motors and driving assemblies may be used, such as a motor with a worm gear, depending on the needs of a particular application.

The everted ball screw assembly 200 may include a housing with a base plate 60 and a linear position sensor 140. The sensor 140 may include a number of discrete sensor elements positioned along the length of the everted ball screw assembly 200. For example, a magnet may be embedded or otherwise attached to one or more parts, such as the ball cylinder 20 described herein, such that the magnet will trigger one of the sensor elements as it passes. The linear position sensor 140 may be any of a variety of linear-position sensing systems.

Figure 2:
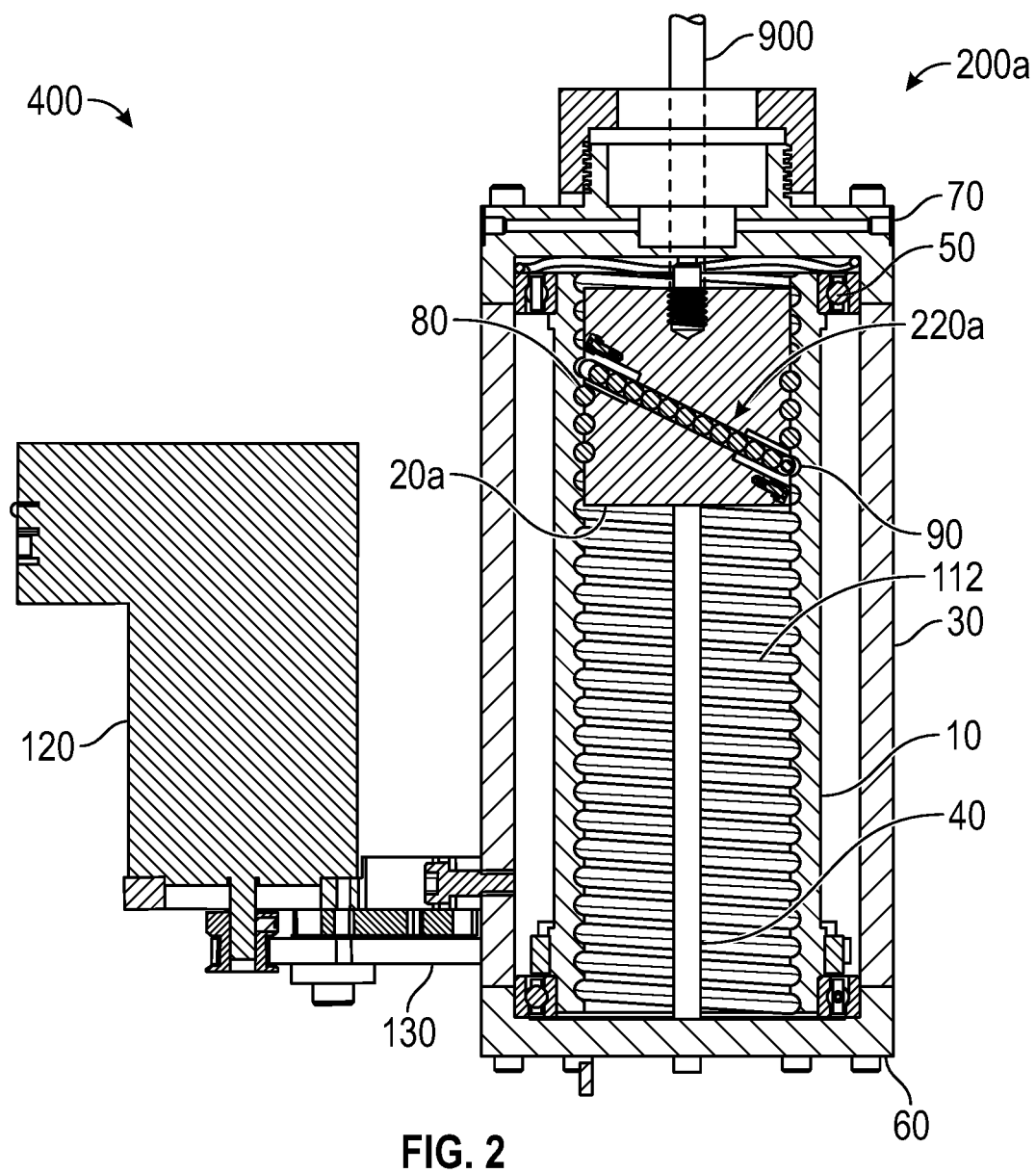
FIG. 2 is a sectional view of the linear actuator assembly taken along line 2-2 of FIG. 1.

FIG. 2 is a sectional view of the linear actuator assembly 400 taken along line 2-2 of FIG. 1. The linear actuator assembly 400, in this implementation, includes a motor 120 driving a first example everted ball screw assembly 200a. As shown, the first example everted ball screw assembly 200a includes a hollow screw shaft 10 with internal threads 112 and a first example ball cylinder 20a with external threads 122a. The ball cylinder 20a is concentrically disposed within a hollow screw shaft 10. The threads 112, 122a are sized and shaped to oppose one another and define between them a substantially continuous working pathway for a plurality of balls 80. After moving along the working pathway, the balls 80 enter and travel through an internal return path 220a which, as shown, passes through the interior of the ball cylinder 20a. The internal return path 220a, together with the working pathway, define a substantially continuous ball circulation pathway. The balls 80 are sized and shaped to fit in a substantially contiguous series when positioned along the ball circulation pathway.

The linear actuator assembly 400, in some implementations, is configured such that the motor 120 imparts rotation to the hollow screw shaft 10, thereby driving the balls 80 along the ball circulation pathway and, in turn, imparting linear motion to the ball cylinder 20a. The ball cylinder 20a, as shown, may be connected to a rod 900. The ball cylinder 20a moves through a linear distance called a stroke length. For the linear actuator assemblies 400 described herein, the housing 30 is slightly longer than the stroke length (plus the thicknesses of the end plates 60, 70) and the entire assembly 400 is about two (2) times the stroke length. A conventional ball screw assembly is more than three (3) times the stroke length. In this aspect, the housings 30 and assemblies 400 described herein are shorter in length and capable of operating in a relatively small space.

The everted ball screw assemblies 200 described herein a larger effective radius (compared to a conventional ball screw) because the balls 80 travel along external threads 122a located on the outer surface 28 of the ball cylinder 20a. A conventional ball screw assembly has a smaller effective radius because the balls travel inside the nut, closer to the central axis of the threaded shaft. Because of the larger effective radius, the everted ball screw assemblies 200 described herein are capable of withstanding eccentric loads without bending or buckling, and without the need for additional support structures. In this aspect, the everted ball screw assemblies 200 described herein are better able to accommodate eccentric loading relative to a similarly sized conventional ball screw.

Figure 3:
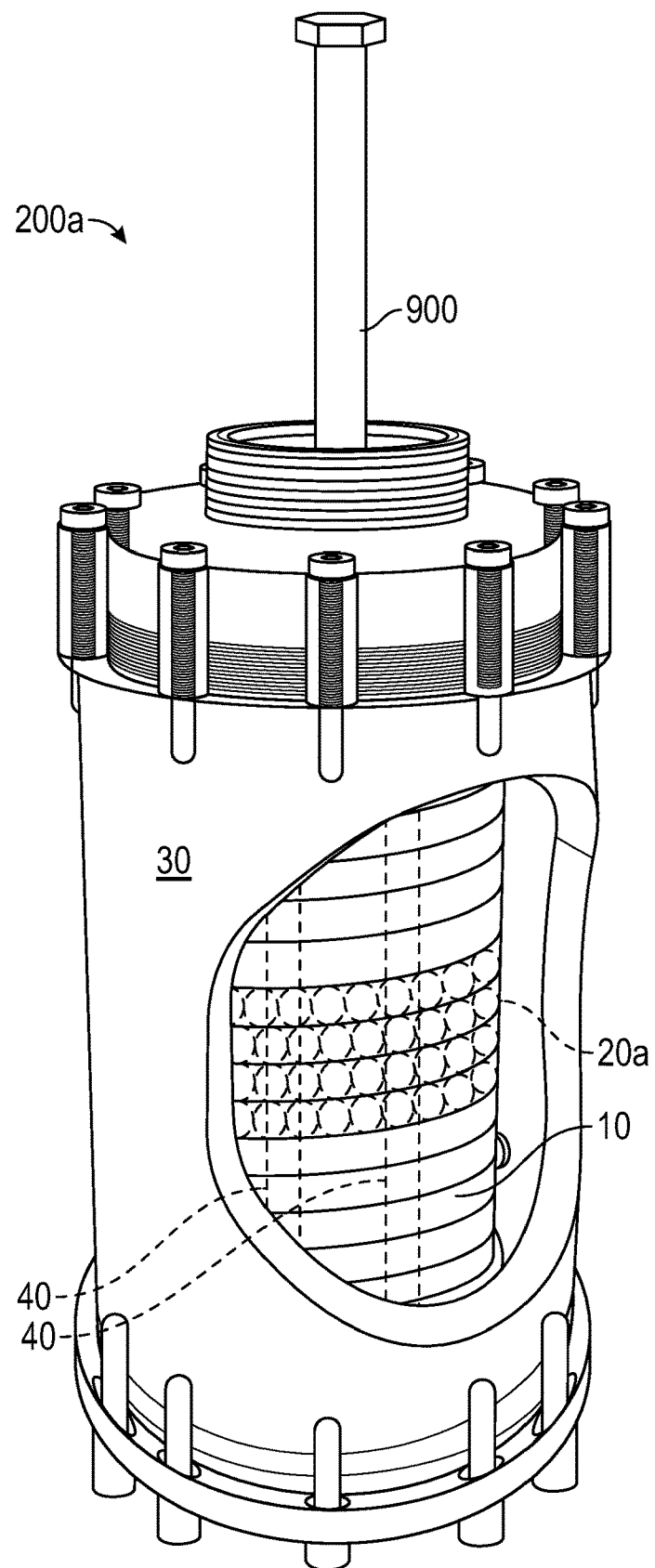
FIG. 3 is a perspective view of an everted ball screw assembly inside a housing, in accordance with some implementations.

FIG. 3 is a perspective view of the first example everted ball screw assembly 200a inside a housing 30. The rod 900 extends through an opening in the upper plate of the housing. The cutaway opening (for illustration purposes only) in the side of the housing 30 shows the ball cylinder 20a inside the hollow screw shaft 10. The assembly 200a also includes a limiter 40 that impedes rotation of the ball cylinder 20a as it travels in a linear direction inside the hollow screw shaft 10. The limiter 40, as shown in this view, includes one or more elongate shafts that are sized and shaped to pass through one or more holes in the ball cylinder 20a unimpeded.

Figure 4:
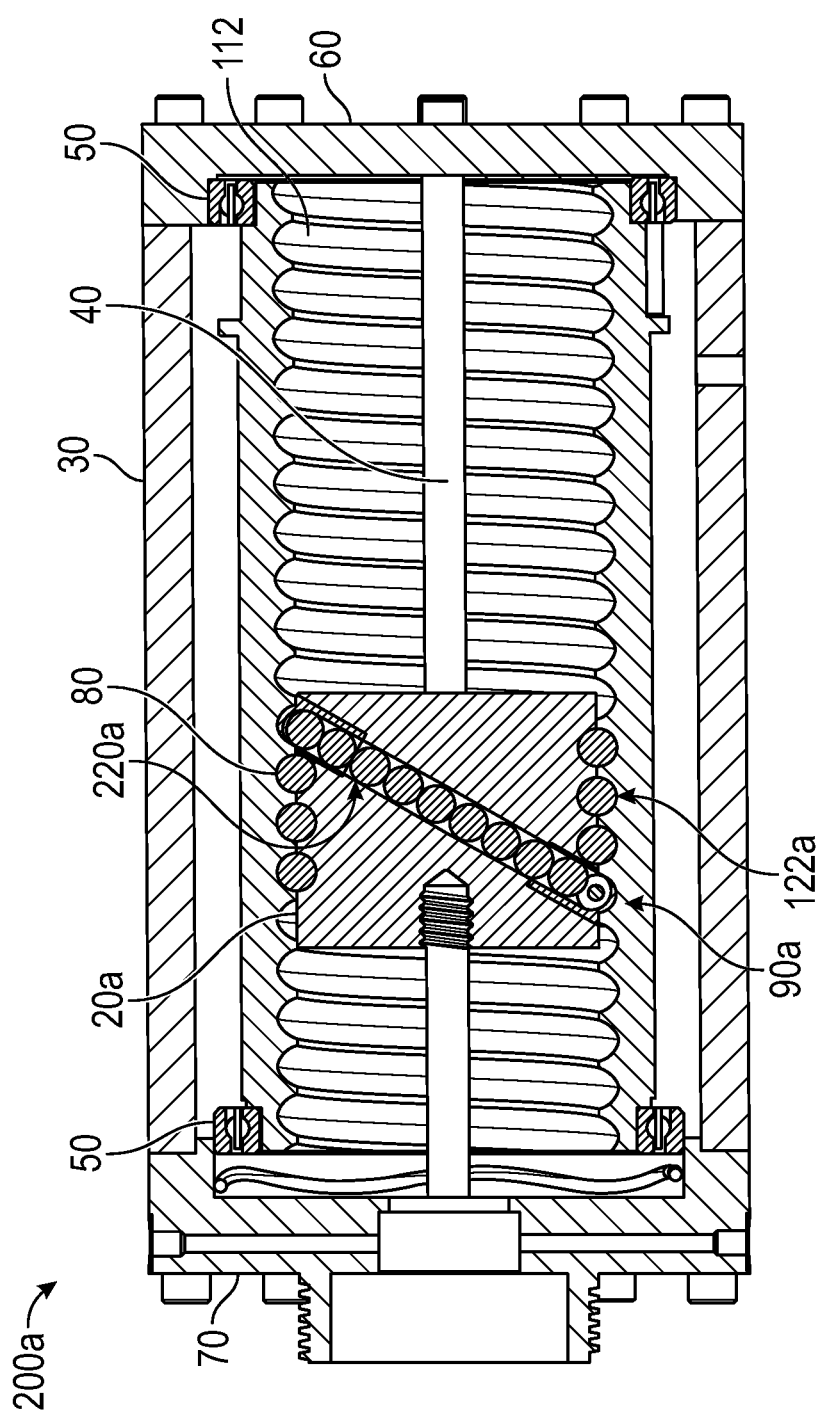
FIG. 4 is a sectional view of an everted ball screw assembly, showing a first example ball cylinder and first internal return path, in accordance with a first implementation.

FIG. 4 is a sectional view of the first example everted ball screw assembly 200a, showing the ball cylinder 20a inside the hollow screw shaft 10. The hollow screw shaft 10 includes an internal thread 112 that extends lengthwise along all or part of the internal surface of the shaft 10, as shown. The first example ball cylinder 20a includes an external thread 122a that is sized and shaped to oppose the internal thread 112 and therebetween define a substantially continuous and generally helical working pathway. The external thread 122a on the ball cylinder 20a may extend lengthwise along all or part of the external surface of the ball cylinder 20a.

As shown, the external thread 122a in this implementation is configured to allow the balls 80 to complete about three and a half turns around the ball cylinder 20a before being guided into the internal return path 220a. The number of turns may be designed to match the expected load capacity to be driven by the ball screw assembly 200a. The number of turns also depends on the course taken by the internal return path.

The matching threads do not engage like a typical nut and bolt, leaving little or no space in-between. Instead, the matching threads 112, 122a are sized and shaped to define an open space—a working pathway along which balls 80 travel between the ball cylinder 20a and the hollow screw shaft 10. The working pathway is sized and shaped to allow a series of balls 80 to roll or slide, generally unobstructed, between the internal thread 112 of the shaft 10 and the external thread 112a of the ball cylinder 20a. The diameter of the balls 80 is selected to fit within the working pathway.

The everted ball screw assembly 200a, as shown, includes a housing 30 and a support bearing 50. The housing 30 is generally cylindrical and includes a base plate 60, a generally opposing upper plate 70, and a sidewall extending between the plates 60, 70. The support bearing 50 allows the hollow screw shaft 10 to rotate about its central axis while impeding its motion in both the linear direction (to prevent translation) and the radial direction (to keep the shaft 10 centered). The support bearing 50, as shown in this example, may include a plurality of rolling-element bearings positioned at one or more locations in the housing 30. The limiter 40, in this example, includes at least one elongate shaft which passes through the ball cylinder 20a to impede rotation.

In operation, the balls 80 circulate along an endless course referred to herein as the ball circulation pathway. After the balls 80 complete a number of turns around the ball cylinder 20a on the working pathway, the balls 80 travel through an internal return path 220a and then return to the working pathway. The return path 220a and the working pathway together define a ball circulation pathway.

The first internal return path 220a extends along a generally linear path through the body of the ball cylinder 20a. The internal return path 220a may be shaped like a hollow tube or channel, as shown in this example, and the return path 220a may be sized to allow the balls 80 to pass through, unobstructed, in a substantially contiguous series.

In some implementations, the first example ball cylinder 20a includes a scoop 90a that is sized and shaped to guide the balls 80 from the working pathway into the internal return path 220a. Another scoop 90a may be positioned to guide the balls 80 out of the return path 220a and back onto the working pathway. In some implementations, the scoop 90a is part of a scoop insert, as described herein, which may cooperate with a lash reduction assembly.

As shown, the plurality of balls 80 move and work as rolling elements along the ball circulation pathway in response to rotation of the hollow screw shaft 10. In other example assemblies, the balls move in response to rotation of the ball cylinder 20a. The number and diameter of the balls 80 is selected so they will fit within the ball circulation pathway, in a substantially contiguous series, along the entire length of the ball circulation pathway. The series of balls 80 is described as substantially contiguous because the number and size of the balls 80 may be selected to minimize the amount of empty space or gaps between balls. This empty space is sometimes called slop, backlash, or lash. The lash may be referred to as the gap distance among all of the plurality of balls 80. The lash can be minimized by coordinating the size and number of the balls 80 with the effective total length of the ball circulation pathway. For example, a ball circulation pathway having a total length of ninety centimeters may accommodate ninety balls, each one centimeter in diameter. Some implementations, as described herein, include a lash reduction assembly.

Figure 5A:
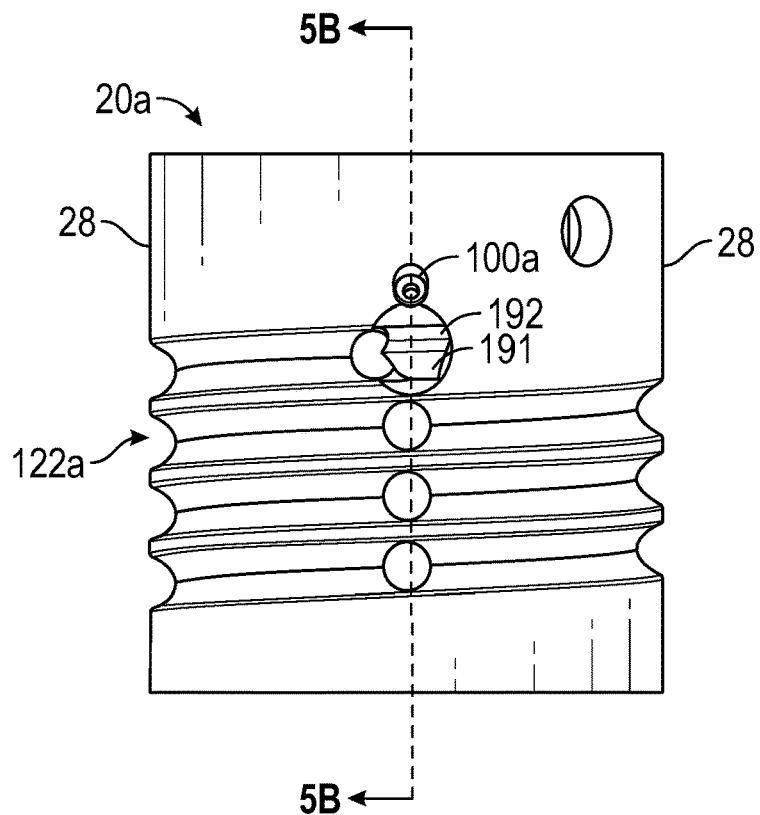
FIG. 5A is a side view of the first example ball cylinder of FIG. 4.

FIG. 5A is a side view of the first example ball cylinder 20a shown in FIG. 4. This view shows that the external thread 122a defines three and a half turns around the outer surface 28 of the ball cylinder 20a. The entrance to the internal return path 220a, in this example, includes a lash reduction screw 110a, which is part of a lash reduction assembly 500a (shown in FIG. 6). Also located at the entrance is a scoop insert 95a (shown in FIG. 6). The scoop portion 90a of the scoop insert 95a, as shown in FIG. 5A, includes a first contour 191 and a second contour 192 on the outermost part of the scoop 90a. These contours 191, 192 are shaped to generally match the shape of the internal thread 112 of the screw shaft 10, so that the scoop 90a will fit within the shape of the helical working pathway without interfering with the internal threads 112 of the screw shaft 10. In this aspect, the contours 191, 192 avoid or reduce friction between the scoop 90a and the nearby threads.

Figure 5B:
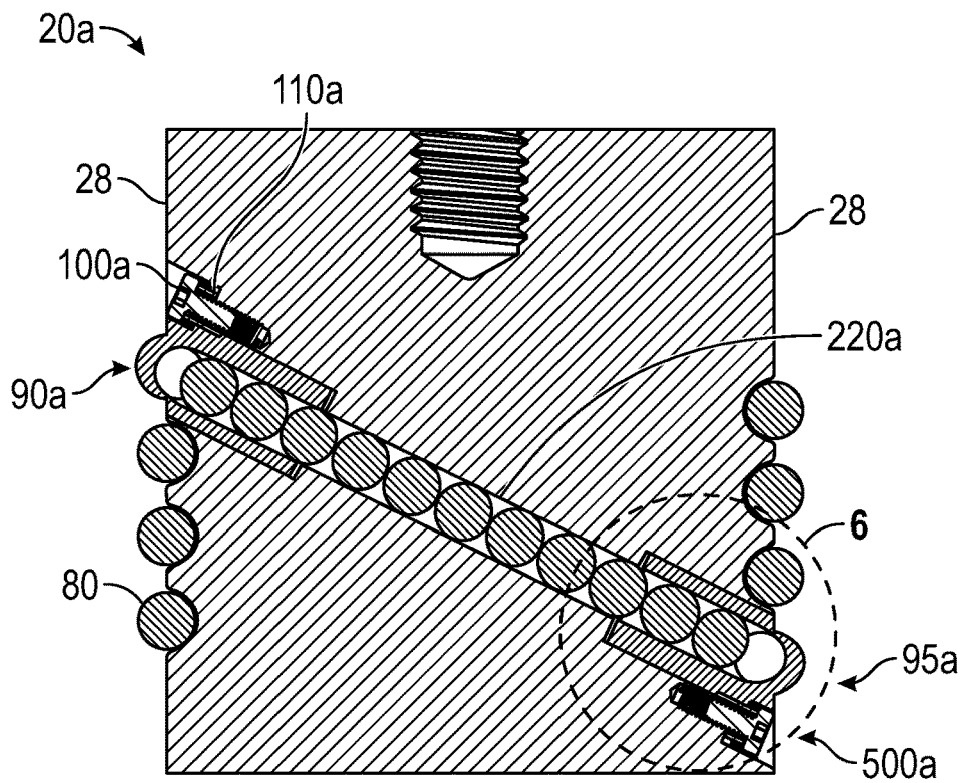
FIG. 5B is a sectional view of the first example ball cylinder taken along line 5B-5B of FIG. 5A.

FIG. 5B is a sectional view of the first example ball cylinder 20a taken along line 5B-5B of FIG. 5A. The plurality of balls 80, as shown, travel along the external thread 122a and are guided into the internal return path 220a by a scoop portion or scoop 90a. The scoop 90a is sized and shaped to guide the balls 80 as they move from the working path to the internal return path 220a. The ball cylinder 20a in this example includes a scoop insert 95a and a lash reduction assembly 500a at bath ends of the internal return path 220a. The scoop insert 95a includes a scoop portion 90a and a body portion 96 (shown in FIG. 8A). The lash reduction assembly 500a, as shown, includes the scoop insert 95a, a lash reduction screw 100a, and a lash reduction spring 110a.

Figure 6:
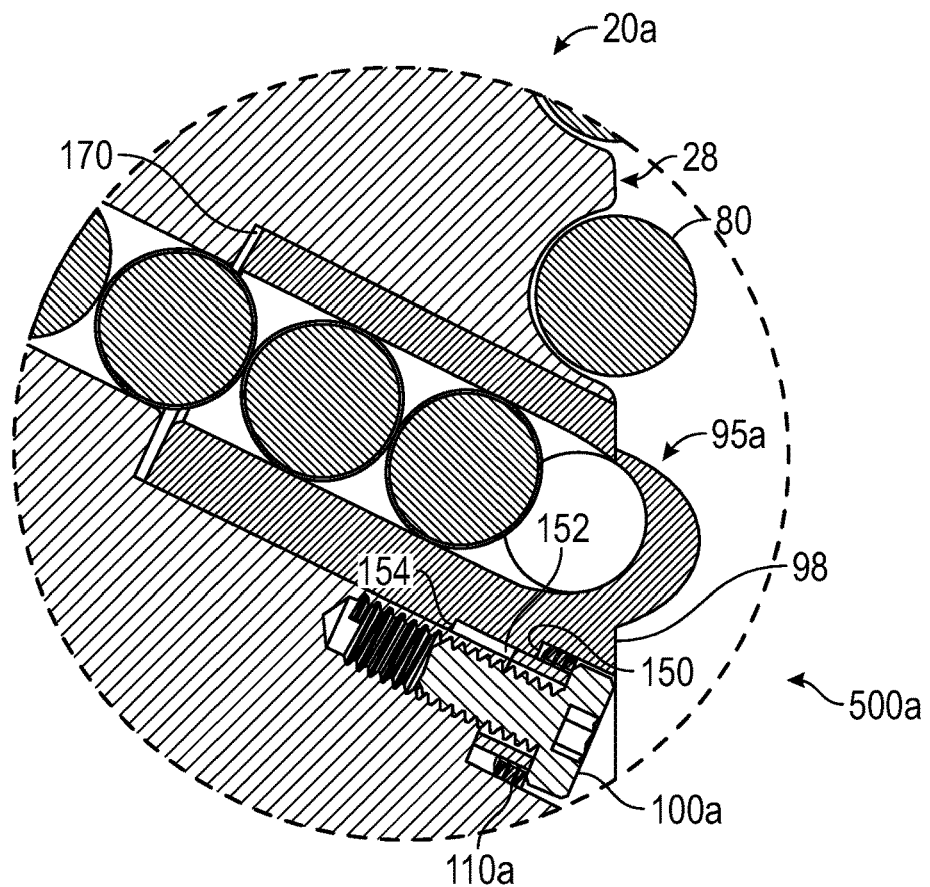
FIG. 6 is a detailed cutaway view of the circular area 6 in FIG. 5B, showing a scoop insert and a lash reduction assembly of the first example ball cylinder.

FIG. 6 is a detailed sectional view of the circular area 6 in FIG. 5B, showing the scoop insert 95a and the lash reduction assembly 500a at both ends of the internal return path 220a. Each ball 80, as shown, rests against the flanks of the external thread 122a. The scoop insert 95a is sized and shaped to guide each ball 80 into the internal return path 220a. The scoop insert 95a may be sized and shaped to be releasably inserted into a sidewall cavity 170 in the ball cylinder 20a. The scoop insert 95a may be positioned within the cavity 170 so that one or more shoulders (upper shoulder 98, for example) is generally aligned with the outer surface 28 of the ball cylinder 20a.

The lash reduction assembly 500a includes the scoop insert 95a, a set screw 100a, and a lash reduction spring 110a. The depth of the scoop insert 95a relative to the internal return path 220a (and relative to the external surface 28 of the ball cylinder 20a) may be positioned by adjusting the set screw 100a. During operation, as the balls 80 pass, the depth of the scoop insert 95a may be maintained by the action of the lash reduction spring 110a. The lash reduction assembly 500a may also include a spacer 152, as shown. In this implementation, the scoop insert 95a includes a first ledge 150, which serves as a support of contact point for the lash reduction spring 110a. The scoop insert 95 also includes a second ledge 154, which facilitates the alignment of the lash reduction assembly 500a relative to the sidewall cavity 170 and also acts as a mechanical stop for the movement of the lash reduction assembly 500a.

Figure 7:
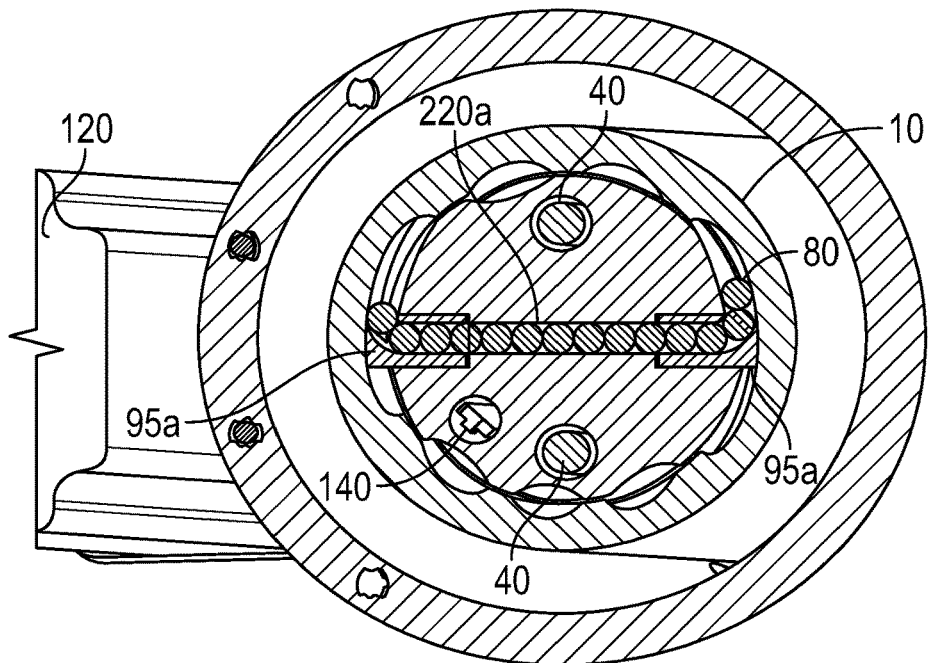
FIG. 7 is a partial, sectional view of the linear actuator assembly shown in FIG. 1, taken through the first example internal return path.

FIG. 7 is a partial, sectional view of the linear actuator assembly 400 shown in FIG. 1. The section is taken through and along the first example internal return path 220a. As shown, the internal return path 220a has a scoop insert 95a positioned at both ends; in other words, an entrance scoop insert and an exit scoop insert. The limiter 40, in this implementation, includes two elongate shafts that are sized and shaped to pass through matching holes in the ball cylinder 20a in order to facilitate unimpeded and linear movement within the hollow screw shaft 10. The linear position sensor 140, in this implementation, includes at least one discrete sensor element that is embedded within the ball cylinder 20a, as shown.

Figure 8A:
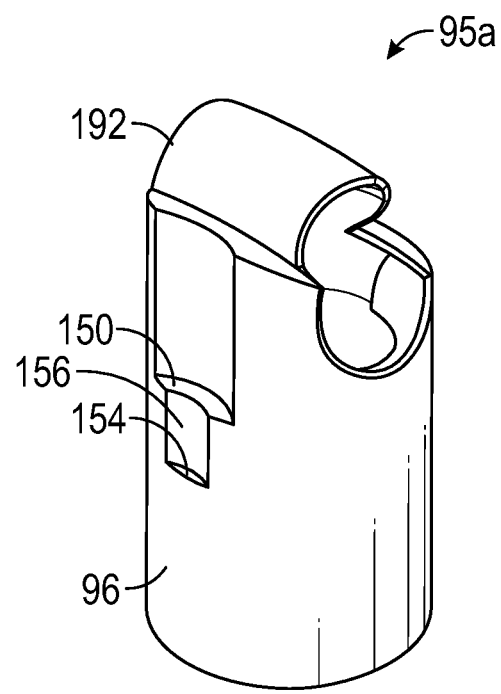
FIGS. 8A through 8F are several views of the scoop insert shown in FIG. 4, FIG. 5B, and FIG. 6.
Figure 8B:
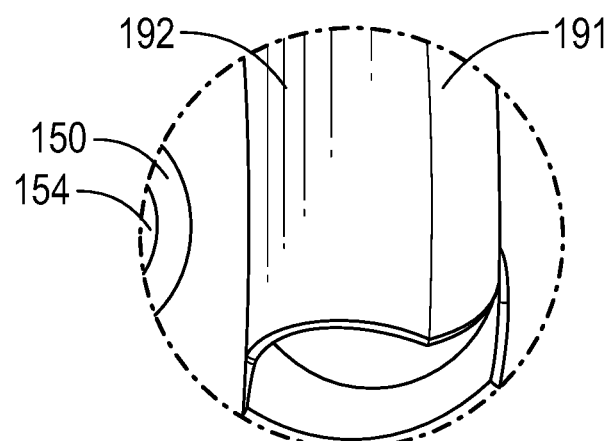
Figure 8C:
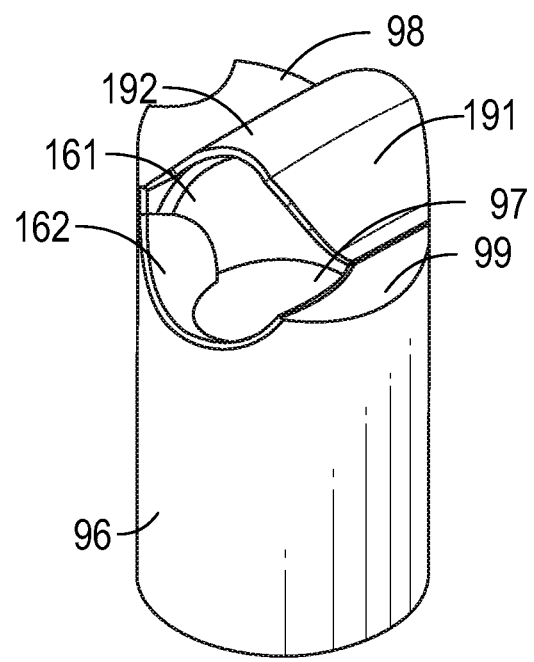
Figure 8D:
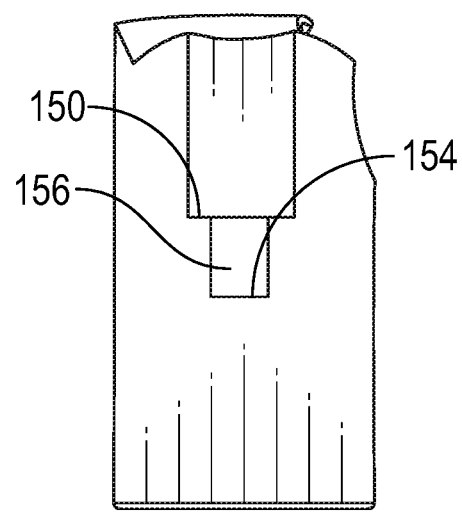
Figure 8E:
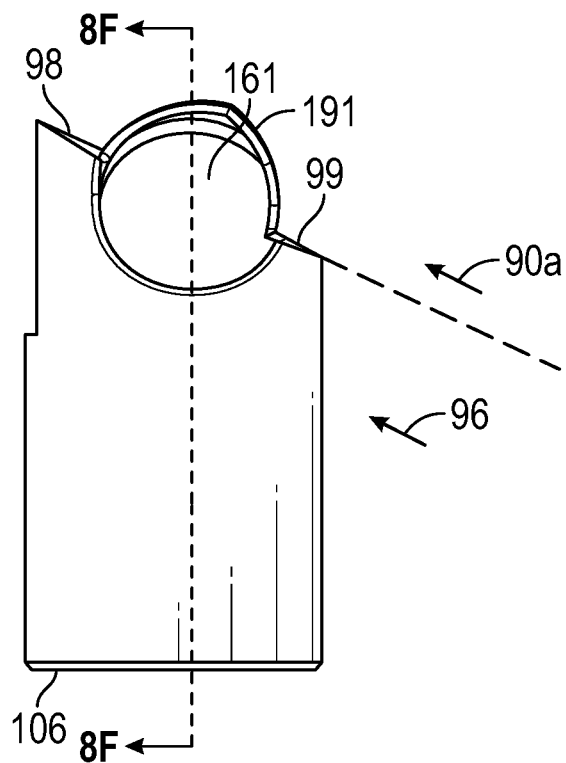

Several views of the scoop insert 95a are shown in FIGS. 8A through 8F. The scoop insert 95a includes a scoop portion 90a and a body portion 96. FIG. 8E is a side view of the scoop insert 95a. The curved plane between the scoop portion 90a and the body portion 96, as shown includes an upper shoulder 98 and a lower shoulder 99 (also shown in FIG. 8C). The shoulders 98, 99 are curved and otherwise shaped to match the external surface 28 of the ball cylinder 20a, as shown in FIG. 6.

The body portion 96 is sized and shaped to be slidably and releasably inserted into a sidewall cavity 170 of the ball cylinder 20a (shown in FIG. 6). The body portion 96 may be generally cylindrical and have a distal end or base 106, as shown, which generally matches the size and shape of the bottom of the sidewall cavity 170. The body portion 96 includes a passage 97 through which the balls 80 travel and enter the internal return path 220a. In this aspect, the passage 97 is in circulatory communication with the working pathway and the internal return path 220a.

The shape of the scoop portion 90a is complex because it fits between the external threads 122a of the ball cylinder 20a and the internal threads 112 of the hollow screw shaft 10. The scoop 90a, as shown in FIG. 6, is oriented at an acute angle relative to the outer surface 28 of the ball cylinder 20a, which complicates the geometry of the scoop's interaction with the internal threads 112 of the hollow screw shaft 10. As shown, the scoop portion 90a includes a first contour 191 and a second contour 192. These contours 191, 192 are shaped to allow the scoop 90a to fit within the shape of the helical working pathway without interfering with the internal threads 112 of the screw shaft 10.

FIG. 8A is a perspective view of the scoop insert 95a, which shows the second contour 192 of the scoop portion 90a. The body portion 96, as shown, includes one or more hollows ending in a first ledge 150 and a second ledge 154. The first ledge 150 serves as a contact point for the innermost end of the lash reduction spring 110a (FIG. 6). The second ledge 154 facilitates the alignment of the lash reduction assembly 500a relative to the sidewall cavity 170. The wall 156, together with the ledges 150, 154, are sized and shaped to facilitate the alignment of various surfaces and features of the scoop insert 95a relative to the sidewall cavity 170.

FIG. 8B is a top view of the scoop insert 95a, showing the contours 191, 192 on the proximal end or top of the scoop 90a and the ledges 150, 154 on the side of the body portion 96.

FIG. 8C is a perspective view of the scoop insert 95a, showing the contours 191, 192 from another perspective. As shown, the scoop 90a includes two or more surfaces shaped to guide the balls 80 into and through the passage 97 which leads to the internal return path 220a. The guiding surfaces, also shown in FIG. 8E and FIG. 8F, in this implementation, include a ball guide 161 and a ball clearance 162. The ball guide 161 is the primary, bowl-shaped internal surface of the scoop 90a for guiding each ball 80 along a generally helical path into the passage 97. The ball clearance 162 is a secondary or additional internal surface that is shaped to guide each ball 80 while allowing for and accommodating both movement of the balls 80 and movement of the scoop insert 95a relative to the sidewall cavity 170, which is reduced and otherwise limited by the lash reduction assembly 500a. In the same way the contours 191, 192 are shaped to match the complex interface with the internal threads 112 of the screw shaft 10, the guides 161, 162 are shaped to match the complex shape of the external threads 122a on the ball cylinder 20a.

FIG. 8D is a side view of the scoop insert 95a, showing the ledges 150, 154 and the side wall 156 located on one side of the body portion 96.

Figure 8F:
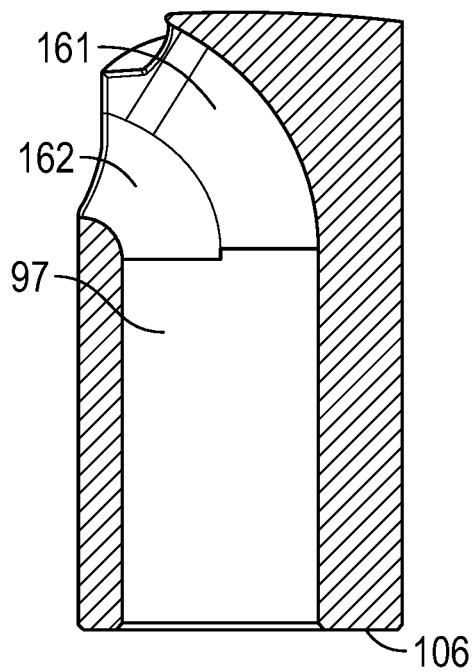

FIG. 8F is a sectional view of the scoop insert 95a taken along line 8F-8F of FIG. 8E. The section intersects part of the upper portion of the ball guide 161. The ball guide 161 in cooperation with the ball clearance 162 guide each ball 80 into the passage 97. The passage 97 is shaped like a hollow tube and sized to accept and allow each ball 80 to travel therethrough unimpeded.

Figure 9:
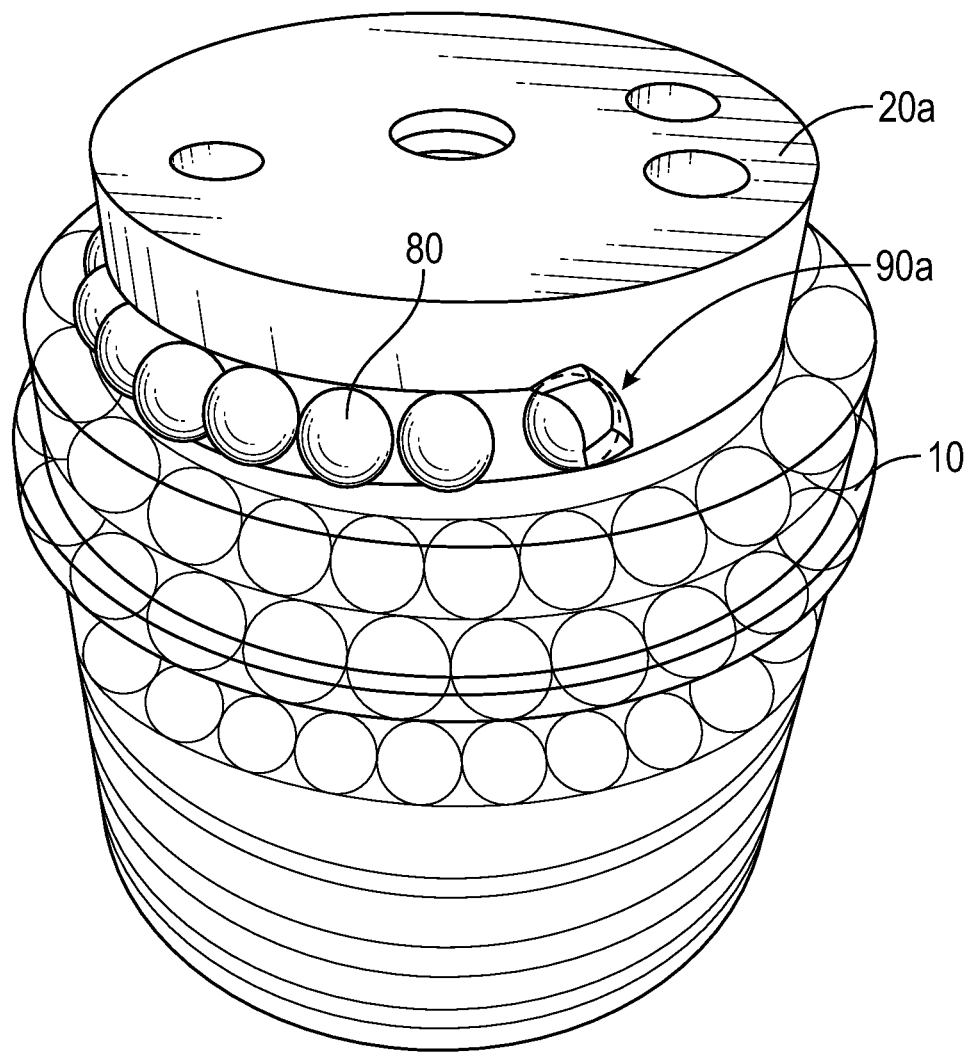
FIG. 9 is a perspective view of a portion of the everted ball screw assembly of FIG. 4, showing a number of balls along a working path and one ball being guided by a scoop into an internal return path.

FIG. 9 is a perspective view of a portion of the everted ball screw assembly of FIG. 4, showing a number of balls 80 along a working path. As shown, one of the balls 80 is being guided by the scoop 90a into the internal return path in the ball cylinder 20a.

Figure 10:
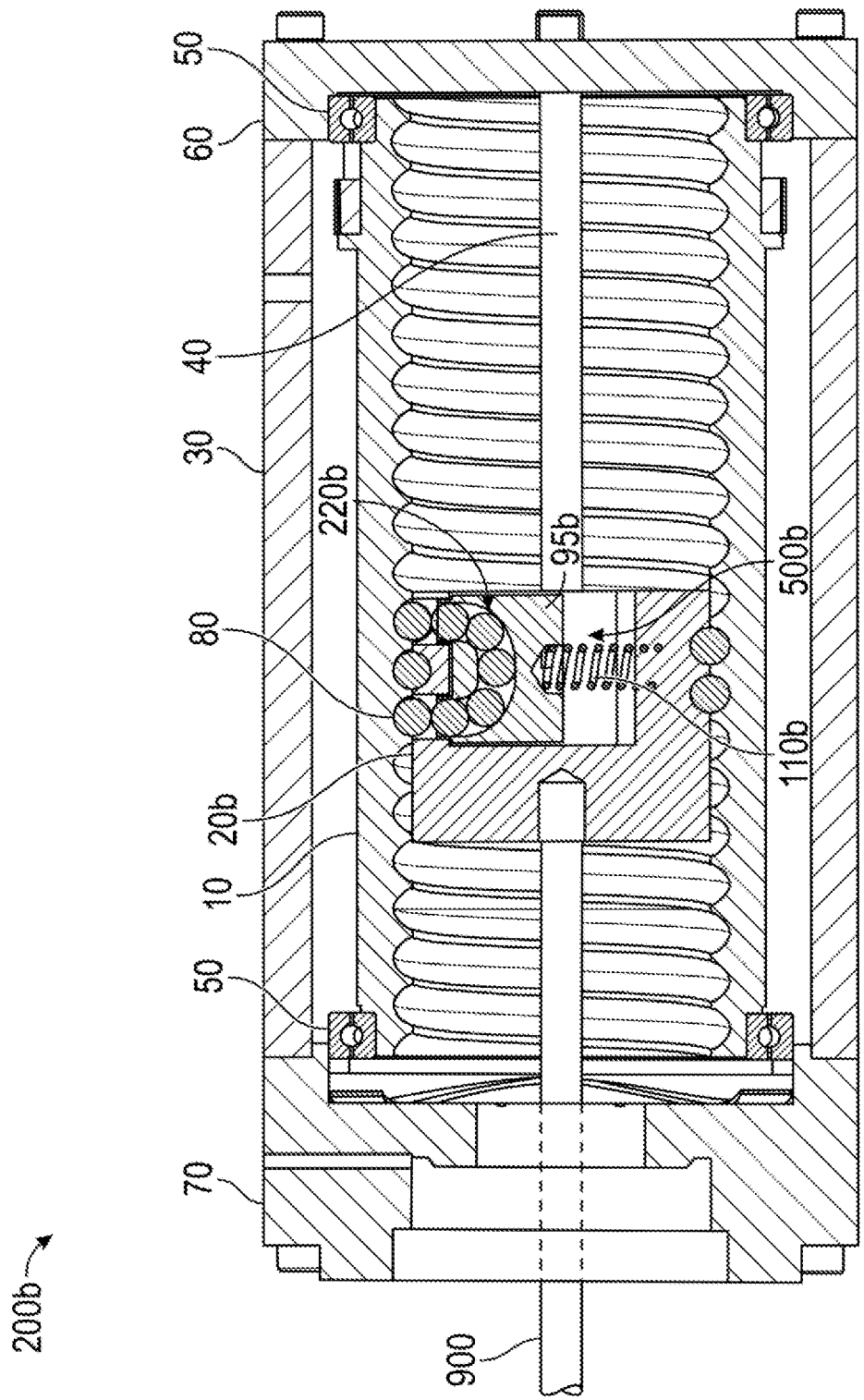
FIG. 10 is a sectional view of an everted ball screw assembly, showing a second example ball cylinder and second internal return path, in accordance with a second implementation.

FIG. 10 is a sectional view of an everted ball screw assembly 200B according to a second implementation. As shown, the second example ball cylinder 20b includes a second internal return path 220b. The return path 220b and the working pathway together define a ball circulation pathway. The return path 220b, in this example, includes a relatively short loop through a portion of the second example ball cylinder 20b. The ball cylinder 20b includes a lash reduction assembly 500b that includes a scoop insert 95b that is moveable using a lash reduction screw and/or a lash reduction spring 110b. Like the first example everted ball screw assembly 200a described herein, the second example everted ball screw assembly 200b shown in FIG. 10 includes a housing 30, a hollow screw shaft 10 supported therein by a bearing 50, and a limiter 40.

What is claimed is:

1. A linear actuator assembly, comprising:
a hollow screw shaft having an internal thread;
a ball cylinder concentrically disposed within said hollow screw shaft and having an external thread that is sized and shaped to oppose said internal thread and therebetween define a substantially continuous working pathway for a plurality of balls of uniform size,
wherein said ball cylinder comprises:
(a) a scoop insert defining a first internal return path therethrough, wherein said first internal return path and said working pathway define a substantially continuous ball circulation pathway, and
(b) a lash reduction assembly comprising a chamber shaped to slidably receive said scoop insert and a lash reduction spring disposed between said scoop insert and said chamber, wherein said lash reduction spring is oriented to urge said scoop insert toward said working pathway; and
a motor configured to rotate said hollow screw shaft, thereby driving said plurality of balls along said continuous ball circulation pathway, and thereby imparting a linear motion to said ball cylinder.

2. The linear actuator assembly of claim 1, further comprising:
a support bearing for supporting said hollow screw shaft in a housing, wherein said support bearing is configured to inhibit linear motion and facilitate rotation of said hollow screw shaft relative to said housing; and
one or more limiters positioned within said hollow screw shaft and passing through said ball cylinder, such that said one or more limiters inhibit rotation and facilitate linear motion of said ball cylinder relative to said housing.

3. The linear actuator assembly of claim 1, further comprising:
a housing, wherein said housing comprises a base plate, an upper plate, and at least one sidewall extending therebetween; and
a rod connected to said ball cylinder and configured to be slidably driven by said ball cylinder through an opening in said upper plate, such that at least part of said rod retracts through said opening and into said hollow screw shaft when said ball cylinder retracts relative to said upper plate, and wherein said rod is connected to a load to be actuated.

4. The linear actuator assembly of claim 1, wherein said external thread defines three and a half turns around said ball cylinder.

5. The linear actuator assembly of claim 1, wherein said scoop insert is sized and shaped to guide said plurality of balls between said working pathway and said first internal return path.

6. The linear actuator assembly of claim 5, wherein said first internal return path extends from a first opening at a first location along said external thread of said ball cylinder to a second opening at a second location along said external thread, wherein said second opening is spaced apart from said first opening.

7. The linear actuator assembly of claim 1, wherein the scoop insert is sized and shaped to guide said plurality of balls between said working path and said internal return path, and
wherein said scoop insert comprises a body portion and a scoop portion, said portions together defining a passage therethrough, said passage in circulatory communication with said working pathway and with said internal return path.

8. The linear actuator assembly of claim 7, wherein said scoop insert comprises an entrance scoop insert and an exit scoop insert positioned at opposing ends of said internal return path.

9. The linear actuator assembly of claim 7, wherein said ball cylinder defines a cylindrical outer surface, wherein said external thread is disposed lengthwise on a portion of said cylindrical outer surface, and wherein said ball cylinder further comprises:
a cavity extending from said cylindrical outer surface to a depth, said cavity being coaxial with said internal return path,
wherein said body portion of said scoop insert is sized and shaped to be slidably received in said cavity, such that said scoop portion extends at least partially beyond said cylindrical outer surface of said ball cylinder.

10. The linear actuator assembly of claim 9, wherein said body portion includes one or more shoulder surfaces adjacent said scoop portion and shaped to match said cylindrical outer surface of said ball cylinder.

11. The linear actuator assembly of claim 9, wherein said scoop portion comprises one or more exterior contours which together correspond in size and shape to said working pathway, such that said contours substantially fill said working pathway while maintaining a clear distance between said scoop portion and said internal thread of said hollow screw shaft.

12. The linear actuator assembly of claim 9, wherein said body portion comprises one or more guiding surfaces which together correspond in size and shape to said working pathway, such that said guiding surfaces cooperate to guide said plurality of balls into said passage.

13. The linear actuator assembly of claim 9, wherein said ball circulation pathway has an effective total length, wherein said plurality of balls when positioned along said ball circulation pathway defines a gap distance among said plurality of balls, and wherein said lash reduction assembly further comprises:
   a lash reduction screw positioned to set and adjust said scoop insert relative to said depth of said cavity; and
   the lash reduction spring is positioned between said screw and said scoop insert,
   wherein said lash reduction screw and said lash reduction spring cooperate to reduce said effective total length and thereby reduce said gap distance.

14. The linear reduction assembly of claim 13, wherein said body portion of said scoop insert further comprises:
   a first ledge positioned and shaped to support said lash reduction spring;
   a second ledge positioned and shaped to support and align said lash reduction assembly relative to said cavity.

15. An everted ball screw assembly, comprising:
   a hollow screw shaft having an internal thread;
   a support bearing for supporting said hollow screw shaft in a housing, wherein said support bearing is configured to inhibit linear motion and facilitate rotation of said hollow screw shaft relative to said housing;
   a ball cylinder concentrically disposed within said hollow screw shaft and having an external thread that is sized and shaped to oppose said internal thread and therebetween define a substantially continuous working pathway for a plurality of balls of uniform size,
   wherein said ball cylinder comprises:
   (a) a scoop insert defining a first internal return path therethrough, wherein said scoop insert is sized and shaped to guide said plurality of balls between said working pathway and said first internal return path, and wherein said first internal return path and said working pathway define a substantially continuous ball circulation pathway, and
   (b) a lash reduction assembly comprising a chamber shaped to slidably receive said scoop insert and a lash reduction spring disposed between said scoop insert and said chamber, wherein said lash reduction spring is oriented to urge said scoop insert toward said working pathway; and
   one or more limiters positioned to inhibit rotation and facilitate linear motion of said ball cylinder relative to said housing, such that rotation of said hollow screw shaft drives said plurality of balls along said continuous ball circulation pathway, thereby imparting a linear motion to said ball cylinder.

\* \* \* \* \*